Aug. 24, 1948.  S. S. MANSON  2,447,517
ELECTRICAL ANALYZER FOR 45° STRAIN ROSETTE DATA
Filed March 12, 1945  2 Sheets-Sheet 1
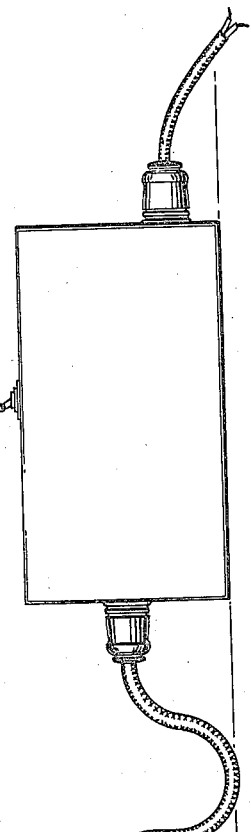
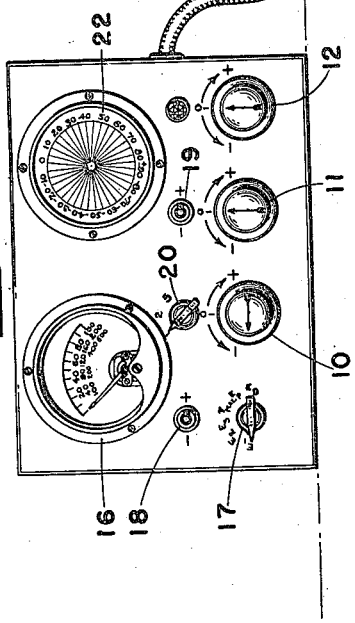
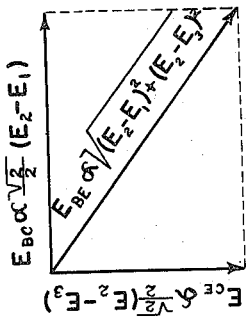
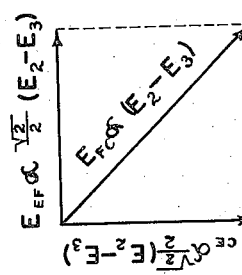
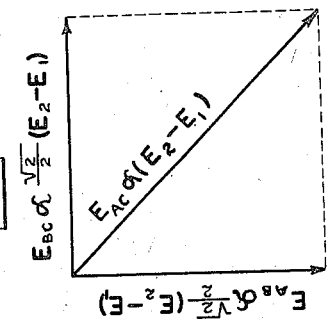
Inventor
SAMUEL S. MANSON
By Ralph L Chappell
Attorney Patented Aug. 24, 1948

2,447,517

UNITED STATES PATENT OFFICE 2,447,517

ELECTRICAL ANALYZER FOR 45° STRAIN ROSETTE DATA

Samuel S. Manson, Cleveland, Ohio

Application March 12, 1945, Serial No. 582,371

2 Claims. (Cl. 235—61)

(Granted under the act of March 3, 1883, as amended April 30, 1928; 370 O. G. 757)

This invention relates to an electric analyzer for 45° strain rosette data for computing the maximum shear strain and major and minor principal strains from a 45° strain rosette consisting of only three gages, 0°, 45° and 90° apart, mounted at selected points on a thin wall stressed surface structure.

The object of this invention is to provide a simple calculator that obviates the use of mechanically trained personnel in a fraction of the time required by any known long hand method.

Another object of this invention is to provide a cheap, compact, portable and easily assembled computer arrangement of standard electrical elements.

The objects are attained by mechanism illustrated in the accompanying drawings, in which:

Fig. 1 is a front view of the panel of the analyzer of this invention;

Fig. 2 is a front view of the power section shown in connected relationship with Fig. 1;

Fig. 4 shows the resolution of voltage $E_{AC}$ of Fig. 3;

Fig. 5 shows the resolution of voltage $E_{FC}$ of Fig. 3; and

Fig. 6 is the vector addition of $E_{CE}$ and $E_{BC}$.

Figure 3:
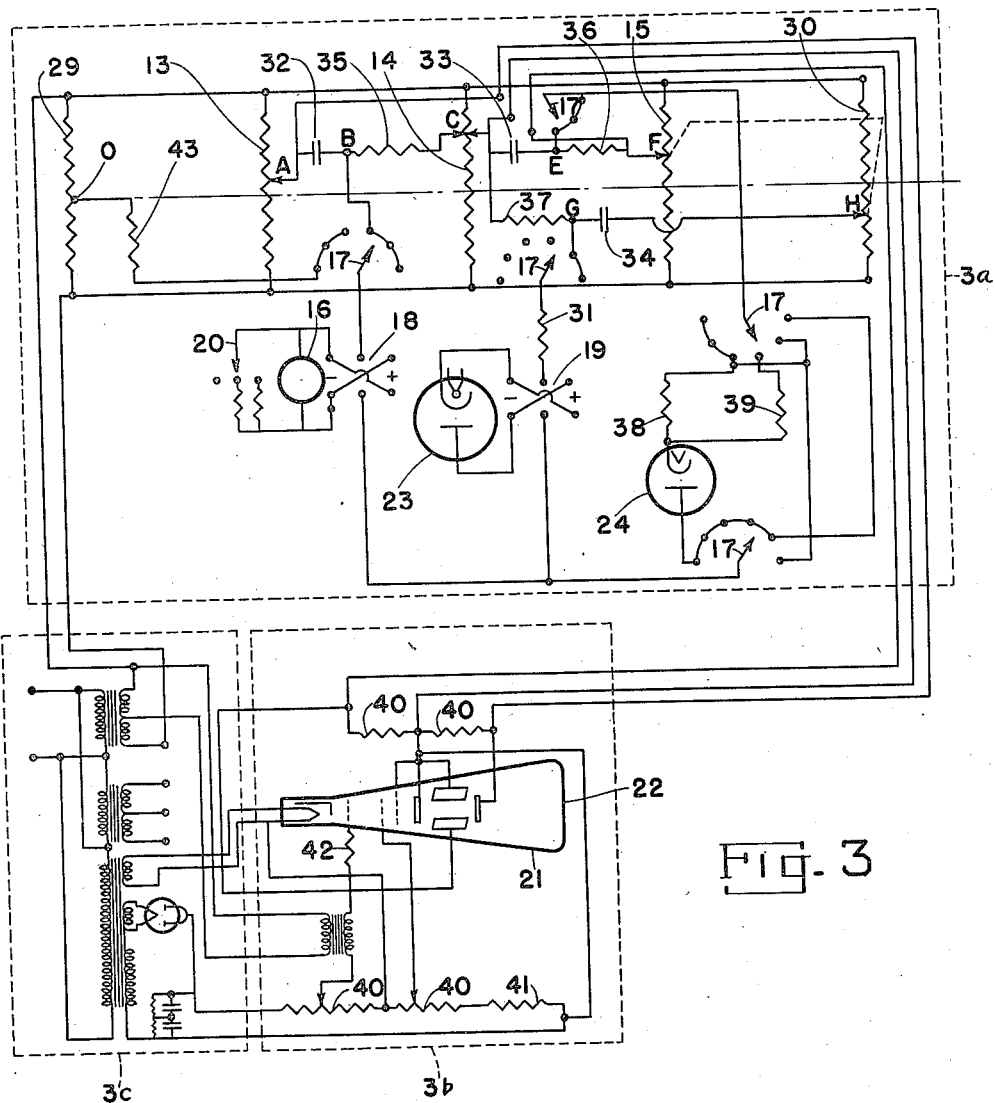
Fig. 3 is a circuit diagram of the analyzer of this invention divided in, 3a, the panel section, 3b, the cathode ray tube, and 3c, the power circuits.

The following symbols are used throughout; $E_1$, $E_2$ and $E_3$ represent the observed strained indications on gages (not shown), one, two and three, respectively, of a 45° strain rosette. Gage 1 is the reference gage and gages two and three are oriented respectively, at 45° and 90° positive, counterclockwise to gage 1. $E_p$ and $E_q$ are the major and minor principal strains at the point of the surface of test in microinches per inch. $Y$ max. represents the maximum shear strain at the point of surface under test in microinches per inch. $\theta_p$ is the angle of major principal axis in degrees measured position counterclockwise from the reference gage 1 of the rosette (not shown). Three knobs, 10, 11, 12, for setting the input strains from the rosette, are shown in Fig. 1. These knobs actuate voltage taps on potentiometers 13, 14, 15 (Fig. 3), placed across a 60 cycle input line. Rotating the knobs clockwise introduces voltages into the analyzer representing positive strains. Similarly, a counterclockwise movement represents negative strains. These settings are indicated by a microammeter 16. A master selective switch 17 is provided for denoting the quantity being indicated by the meter 16.

This switch 17 consists of five of the six-positioned selector switches ganged together on a common shaft. Two polarity reversing switches 18, 19 are provided which require initial adjustment. The strains $E_1$ and $E_3$ are compared and if the larger arithmetical of the two is positive, the $E_1$ plus $E_3$ switch 19 is turned to the plus position, while if the larger is negative, the switch is turned to the minus position. This switch is merely a reversing control, and consequently, switching a selector to positive causes current to pass in a position direction through the meter. Likewise, a reversing switch 18 for the meter is also provided, and its purpose is to indicate whether the principal stresses are positive or negative. Three scales are marked on the meter 16, 0 to 100, 0 to 200 and 0 to 500, which permit meter 16 to be used over much wider range. Shunts for reducing the meter curent for one half and one fifth are also provided by a knob 20. In some problems, the choice of a scale which permits the meter to be used at a fair portion of its range in the setting of $E_1$, $E_2$ and $E_3$, results in a determination of maximum shear or principal strain larger than the maximum value of the indicator scale, shown at 16. When this occurs, these shunting switches are introduced and compensated for by multiplying the meter reading by two or five, depending on the scale factor used.

Indication of the orientation of the major principal axes is accomplished by means of a cathode ray tube oscillograph 21, the screen 22 of which is covered with a calibrated radial line scale, best shown in Fig. 1. After the settings for the three strains, $E_1$, $E_2$ and $E_3$ from the rosette have been adjusted, a straight line is found to appear on the oscillograph screen 22. This line passes through the origin, a portion on one side of the origin being longer than the portion on the other side, the shorter part being tapered at its end while the longer is of uniform width through its length with a bright spot at its extremity. This longer line points to a scale value which indicates the direction of the major principal axes with reference to gage line of the rosette (not shown). The cathode ray tube 21 acts as a ratio meter and indicates the ratio of the voltages which in turn determine the orientation of the major axes.

The principal components of the electrical circuit of Fig. 3 are the strain setting potentiometers 13, 14, 15, resistor-condenser combinations and two diode rectifiers 23, 24. The resistor-condenser combinations rotate the phase of voltages by the taps of the potentiometer so that the vector sums of combinations of these voltages yield direct expressions contained in the mathematical formulas for strain.

The operation of this analyzer can well be illustrated by means of a concrete example. Given the 45° rosette data, $E_1$ equals 150, $E_2$ equals 200 and $E_3$ equals minus 250 microinches per inch, determine $\theta_p$ Y max. $E_p$ and $E_q$. The polarity switches 18, 19 are first adjusted. The meter polarity 18 is switched to plus as it should always be at the beginning of any analysis, since the larger of $E_1$ and $E_3$ is negative, the $E_1$ plus $E_3$ toggle 19 is switched to minus. The meter range 0 to 500 is apparently most suitable and is consistently used throughout the analysis. Switch 20 is brought to the one position, the master selector switch 17 is brought to the $E_1$ position, and the dial 10 for $E_1$ is turned clockwise until the meter 16 reads 150. With the master selector switch 17 in the $E_2$ position, the $E_2$ dial 11 is turned clockwise until the meter 16 reads 200. With the master switch 17 in the $E_3$ position, the dial 11 for $E_3$ is turned counter-clockwise until the meter reads 250. The cathode ray oscillograph 21 is examined and it appears that the larger portion of the line through the origin points to a value equal to 26° on scale 22. The master selector 17 is turned to the Y max. position. The meter pointer 16 is observed to be off scale so that scale factor switch 20 is turned to two. The meter 16 reading is 320, hence, two times 320 equal 640 microinches per inch. The master selector 17 is turned to $E_p$, the meter 16 reads 275, when the meter factor 20 is returned to unity. Hence $E_p$ equals 275 microinches per inch. The master selector 17 is turned to $E_q$, the meter 16 reads off scale to the left so its polarity is switched by 18 to minus. The meter 16 reads 370, hence $E_q$ equals minus 370 microinches per inch. The accuracy of the reading is determined to be in the neighborhood of 2% full scale. Similarly, the angularity is indicated correctly to two degrees.

Theory of operation

The electrical circuit of the analyzer was designed to compute, in a straightforward fashion, the individual quantities appearing in the formulas for strain, and subsequently, to combine these quantities to yield final strains and their orientations. From Frocht, Max Mark, Photo-Elasticity, volume 1, John Wiley and Sons, Inc. We note that $$\text{Y-max. equals } \sqrt{2}\sqrt{(E_2-E_1)^2+(E_2-E_3)^2} \quad (1)$$

In alternate current the vector sum of two A. C. voltages 90° out of phase to each other is numerically equal to the square root of the sum of the squares of the two voltages. The problem of computing the shear strain electrically resolves itself to producing two voltages proportional to $(E_2-E_1)$ and $(E_2-E_3)$, to rotate these voltages until they are at right angles to each other and to add these two voltages electrically. The manner in which the operation is accomplished is evident from Figs. 3–5. In Figs. 3, 13, 14, 15, 29 and 30 are rheostat potentiometers connected across a common 60 cycle A. C. line. In operation, the taps A, C, and F are displaced from the electrical centers O of the potentiometers by distances proportional to $E_1$, $E_2$ and $E_3$, respectively. Thus, the A. C. voltage between A and C is proportional to $(E_2-E_1)$ and the voltage between C and F proportional to $(E_2-E_3)$. These two voltages are placed across impedances consisting of a condenser and a resistor, each condenser being chosen to have capacitive reactance, at the imposed frequencies of 60 cycles, equal to the resistances with which it is connected in series. From Fig. 3, the voltage across the resistor BC is thus equal to $$\frac{\sqrt{2}}{2}E_{AC}$$

where $E_{AC}$ is the voltage between A and C and it leads $E_{AC}$ by 45°. The voltage across CE is equal to $$\frac{\sqrt{2}}{2}E_{CF}$$

and it lags another $E_{CF}$ by 45°. Now $E_{AC}$ and $E_{CF}$ are in phase since they are derived through resistances from a common A. C. source. Hence, the voltage across BC leads the voltage across CE by 90°. Since these two voltages are proportional respectively to $$\frac{\sqrt{2}}{2}(E_2-E_1)$$

and $$\frac{\sqrt{2}}{2}(E_2-E_3)$$

the voltage across BE (the vector sums of $E_{BC}$ and $E_{CE}$) is proportional to $$\frac{\sqrt{2}}{2}\sqrt{(E_2-E_1)^2+(E_2-E_3)^2}$$

It follows that the voltage $E_{BE}$ is just half of the desired maximum shear strain. The factor of 2 is taken into account in the metering of this voltage. Referring to Fig. 3, the process of setting the strains $E_1$, $E_2$ and $E_3$ consists of moving the taps of the rheostat potentiometers 13, 14 and 15 until the desired readings are obtained on a voltmeter which is successively connected by means of a switch between the taps and a fixed point on the reference resistor 29. The voltmeter consists of a D. C. microammeter 16, a diode rectifier 24 and a large series dropping resistor 38. When the master electrical switch is in the Y max. position, the same voltmeter measures the voltage between B and E. It is merely necessary to reduce the metering resistance to half its value when measuring the maximum shear strain and the meter will indicate the full magnitude of the maximum shear strain.

Major and minor principal strains

The expression for the major principal strain is $$E_p=\frac{E_1+E_3}{2}+\frac{\sqrt{2}}{2}\sqrt{(E_2-E_1)^2+(E_2-E_3)^2} \quad (2)$$

The square root portion is precisely the voltage between B and E; hence, it is necessary only to obtain an additional voltage proportional to $(E_1+E_3)$. In Fig. 3, it is noted that there are two rheostat potentiometers, 15 and 30, provided for strain $E_3$. These potentiometers are coupled to the same shaft, and rotated by the same knob 12. However, their inputs from the 60 cycle line are crossed, so that as the knob 12 is rotated, one tap F moves toward one of the input lines, the other tap H moves an equal amount toward the other input line. Thus, the voltage between A and H is proportional to $(E_1+E_3)$. This voltage is placed across two resistors BC and CG, and two condensers AB and GH. The total capacitive reactance between A and H is chosen equal to the total resistance; hence, the voltage across the total resistance, $E_{BG}$, is equal to $$\frac{\sqrt{2}}{2} E_{AH}$$

which in turn is equal to $$\frac{\sqrt{2}}{2}(E_1+E_3)$$

The factor, $\sqrt{2}$, by which this quantity is greater than the desired $$\frac{E_1+E_3}{2}$$

is again taken care of by adjusting the resistance of the circuit measuring this voltage.

When the master selector switch is in the position for measuring $E_p$, both the voltages representing the expressions in Equation 2 feed current through the microammeter 16. The currents due to these voltages are not in phase, however, and if they were added without regard to phase shift, the sum would be a vector sum, and not the scalar sum as required by Equation 2. The expedient used for taking into account the phase difference is the process of rectification. Each of the two currents is independently rectified before it enters the meter 16. The current in the meter thus consists of two D. C. components, each proportional to one of the expressions in Equation 2, plus numerous harmonics which do not activate the direct current meter. The D. C. components, which do activate the meter 16 are in essence in phase, and, therefore, add in scalar form to yield a net result indicating the major principal strain:

The direction in which the current due to $(E_1+E_3)$ flows through the meter depends upon the orientation of the rectifier 23. Hence, a polarity switch for $(E_1+E_3)$ is provided. When the switch is in the plus position, current flows in positive fashion. It is left to the operator to perform the switching operation.

The expression for the minor principal strain is identical with that previously given in Equation 2, except that the sign preceding the square root portion is negative. To obtain the minor principal strain, it is necessary only to reverse the rectifier of the portion feeding current due to the square root expression.

Direction of major principal axes

The angle of the major principal axes measured positive counterclockwise from the direction of gage 1 is $$\tan 2\theta_p = \frac{2E_2-(E_1+E_3)}{E_1-E_3} \quad (3)$$

and may be re-written $$\tan 2\theta_p = \frac{(E_2-E_1)+(E_2-E_3)}{(E_2-E_3)-(E_2-E_1)} \quad (4)$$

or $$\frac{\tan 2\theta_p+1}{\tan 2\theta_p-1} = \frac{E_2-E_3}{E_2-E_1} \quad (5)$$

If, then, a means were devised for indicating the ratio of $(E_2-E_3)$ to $(E_2-E_1)$, this ratio would define a function of $\theta_p$, which in turn would determine $\theta_p$.

Two voltages representing $(E_2-E_1)$ and $(E_2-E_3)$ are present between CA and CF respectively (Fig. 3). These two voltages are in phase, and they vary sinusoidally with time. If they are impressed across the horizontal and vertical plates of a cathode ray oscillograph 21, the horizontal and vertical displacements, $X_t$ and $Y_t$, at any time, $t$, of the cathode beam are $$X_t = K(E_2-E_3) \sin 2\pi ft \quad (6)$$
$$Y_t = K(E_2-E_1) \sin 2\pi ft \quad (7)$$

where K is the deflection sensitivities of both sets of plates in inches per volt, and $f$ is the impressed frequency of 60 cycles per second.

Dividing the Equation 6 by the Equation 7, $$\frac{X_t}{Y_t} = \frac{E_2-E_3}{E_2-E_1} \quad (8)$$

Thus the path traced by the cathode ray spot is a straight line through the origin whose slope is the desired ratio. The straight line, in conjunction with a radial scale, then indicates $\theta_p$. A convenient method of determining the radial scale is to assume consecutive values of $\theta_p$, and to determine from Equation 5 the ratio $$\frac{E_2-E_3}{E_2-E_1}$$

that corresponds to each value of $\theta_p$.

A straight line is seen extending in both directions through the origin points to two angles, one at each end of the line. This ambiguity of angle is due to the fact that the value of the tangent of an angle does not in itself uniquely define the angle. The tangent must be considered as a fraction and the signs of the numerator and denominator must be examined individually in order to determine the quadrant in which the angle lies, and thus the value of the angle itself. The problem is to determine not only the polarity relation between $(E_2-E_1)$ and $(E_2-E_3)$, but also the absolute polarity of each of these quantities, taking the voltage input to the system as reference. By using the latter voltage to modulate the beam of the oscillograph 21, this polarity may be taken into account. In Fig. 3, it is seen that the control grid circuit of the cathode ray tube contains a transformer driven from the input line. The transformer is chosen to bias the grid beyond cut-off at the negative peak of the input cycle, thus removing the beam from the screen during a portion of the cycle. The undiminished line then points to a unique value of $\theta_p$ on the scale. Of course, it is necessary to position the scale and the screen in such a manner that the proper value of $\theta_p$ is indicated.

Stresses

It is possible to devise an analyzer to compute stress instead of strain. The formulas for maximum shear stress and principal stresses contain the same strain combinations, $(E_1+E_3)$ and $(\sqrt{(E_2-E_1)^2+(E_2-E_3)^2})$, as those appearing in the formulas for strain but the coefficients of these equations contain the modulus of elasticity and Poisson's ratio of the material under test.

To convert the strain analyzer to a stress computer, it is only necessary to change the values of the metering resistances, and to add scales on the meter for stress. The same instrument may be made to indicate both stress and strain by the use of a toggle selector switch, or two meters may be provided, one indicating strain, the other stress.

Fig. 3 shows three identical condensers, 32, 33, 34, of 0.5 microfarad, each matched with identical resistors 35, 36, 37, of 5,000 ohms. Actually it is not important that the condensers and resistors be identical; but the accuracy of the instrument is greatly affected by the closeness of the match between each condenser and its particular resistance. Thus, three arbitrary condensers of nominal 0.5 microfarad size may be chosen, and each in turn placed in series with a 60 cycle voltage source and a variable resistor. The resistance is then varied until the measured voltage across it is equal to the measured voltage across the condenser. The proper resistance for each condenser is thus determined.

The operation of setting the strains $E_1$, $E_2$ and $E_3$ into the instrument consists of moving the taps A, C and F of the various potentiometers to points of potential corresponding to the strains. The reference potential is that of a fixed point O in a resistor placed across the input line. Normally, this reference point O would not be unique, and any point approximately half way between the two input lines would be a satisfactory reference. Because the operation of the instrument depends, however, on the fact that for any position of the dial for $E_3$, the tap of one of the coupled potentiometers is as far above the reference point as the tap of the other potentiometer is below it, it follows that there is only one point in the reference resistor which may be taken as the reference potential. To obtain this point, a sensitive voltmeter is first placed between the taps of the coupled potentiometer 15 on the $E_3$ shaft, and the $E_3$ dial is rotated until the voltmeter reads zero. The voltmeter is then connected between one of the $E_3$ taps and a tap on the reference resistor, and the latter tap is adjusted for a zero reading of the voltmeter. The position of the tap on the reference resistance thus determined, is the reference potential of the instrument.

The metering resistance 38 is arbitrarily chosen so as to provide full scale deflection of the meter for the full range of the $E_1$, $E_2$ and $E_3$ dials. The other two metering resistances 39 and 31 are best determined by experiment, since their theoretical values are somewhat obscured by the presence of rectifiers 23, 24. If, for instance, $E_1$ and $E_3$ are set equal to zero, and $E_2$ set to an arbitrary value, then the meter reading, when the master selector switch is set to the Y position, should be twice the value of $E_2$. The resistance 39 is determined by varying its value until this condition prevails. Also, if $E_1$, $E_2$ and $E_3$ are all set to arbitrary equal values, then the reading of the meter when the master selector switch is in the $E_p$ position, should be equal to the arbitrary value of $E_1$, $E_2$ and $E_3$. Resistance 31 is adjusted until this condition prevails.

When a diode rectifier 23 is placed in a relatively low-impedance circuit a small current is found to flow in the circuit even when no external voltage is applied. This phenomenon is due to the fact that emission takes place from the cathode, and some electrons find their way to the plate even when the plate is not positively charged. One expedient for reducing the current flow at zero applied voltage is to reduce the temperature of the cathode. For a 6H6 diode 23 the normal filament voltage is 6.3 volts. It was found that approximately 3.5 volts to the filament provided adequate temperature to permit a full-scale current of 100 microamperes to flow, and at the same time the temperature was low enough to prevent undesirable emission. The filament voltage is reduced by center-tapping a 6.3 volts filament transformer.

Equations 6 and 7 for horizontal and vertical displacements are valid only if the deflection sensitivities of the vertical and horizontal plates are equal. Because of manufacturing tolerances in the cathode ray tube 21, the sensitivities may not be identical; hence resistor gain controls are provided for adjusting them to equality.

The most convenient manner of adjusting the angular scale into its proper position relative to the screen 22, of the cathode ray tube 21 is to orient the screen and scale until the principal angle indication is correct for at least one combination of $E_1$, $E_2$ and $E_3$. Then it is positioned correctly for all other combinations of rosette strains. It is desirable to fix the scale so that the zero direction is vertical. If $E_2$ is set equal to zero, $E_1$ to positive full scale and $E_3$ to negative full scale, the resulting principal angle indication should be zero degrees. The screen 22 is rotated until the line on it points to the zero degree mark on the scale.

While this invention has been described in conjunction with the following value of components, it should be expressly understood that various changes may be made without departing from the spirit of the invention, as defined in the appended claims.

29 = 300 50 w. adjustable tap
13, 14, 15, 30 = 300 50 w. rheostat potential.
35, 36, 37 = 5000 2 w. wire wound
38 = 130,000 1 w. wire wound
39 = 65,000 1 w. wire wound
31 = 185,000 1 w. wire wound
43 = 10,000 2 w.
40 = 100,000 4 w. wire wound
41 = 300,000 1 w.
42 = 300,000 1 w.

While Fig. 1 and Fig. 2 are shown separated by a cable they could be combined in one cabinet if desirable.

The invention described herein may be manufactured and used by or for the Government of the United States of America for governmental purposes without the payment of any royalties thereon or therefor.

What is claimed is:

1. In an electric circuit for determining characteristic data about a stress point on the surface of a thin walled structure to which a rosette is applied consisting of three strain gages mounted at 0°, 45° and 90° about said point for providing signals in accordance with said stresses; a source of alternating current, a pair of lines connected to said source, four potentiometers connected in parallel across said lines and having a center reference point, a movable contact on each of said potentiometers controlled by one of three knobs, each knob being connected for moving the contact on one of said potentiometers for adjusting it with respect to the corresponding center reference point in accordance with the signals obtained from the three strain gages respectively, the fourth contact being moved simultaneously a corresponding amount by the third knob in the opposite direction from its center reference point, a branch comprising a reactance and a resistance, of equal magnitude at the frequency of the alterating current used, connected in series between the first and second contacts, another similar branch between the second and third contacts; a third branch having similar elements, reversed, between the second and fourth contacts, means including a multi-position switch for indicating the combined potential across the resistance of said first branch and the reactance of said second branch in one position of said switch, calibrated to show the value of the maximum shear strain, and for indicating the scalar sum of the above combined potential and the potentials across the resistances of the first and third branches in another position of said switch, said sum being calibrated to show the value of the major principal strain, and the scalar difference between said potential and the sum of the other two potentials to show the value of the minor principal strain, said means including a cathode day oscillograph having a radial scale and means for impressing the potentials across the first and second branches on the normally positioned pairs of plates respectively in said oscillograph, whereby the angle of the major principal axis will be indicated on the radial scale by the resultant trace.

2. In an electric circuit for determining characteristic data about a stress point on a surface to which a rosette has been applied, consisting of strain gages mounted at different relative angular relations about said point, a series of potentiometers connected in parallel across a source of alternating current, means for adjusting movable contacts along three of said potentiometers in accordance with the readings obtained from said rosette strain gages and for adjusting the movable contact along said fourth potentiometer in accordance with the negative of one of the readings of said rosette strain gage, series resistances and condensers between said movable contacts, and means for measuring the potentials across portions of said potentiometers and their associated series resistances and condensers to obtain the resultant major strain directions and amounts as well as the value of the maximum shear strain.

SAMUEL S. MANSON.

REFERENCES CITED

The following references are of record in the file of this patent:

UNITED STATES PATENTS

| Number | Name | Date |
|---|---|---|
| 2,375,227 | Hillman | May 8, 1945 |
| 2,382,994 | Holden | Aug. 21, 1945 |
| 2,385,334 | Davey | Sept. 25, 1945 |